United States Patent
Andersen et al.

(10) Patent No.: US 8,721,306 B2
(45) Date of Patent: May 13, 2014

(54) PUMP UNIT

(75) Inventors: Lars Kannegaard Andersen, Randers (DK); Steen Mikkelsen, Bjerringbro (DK); Brian Lundsted Poulsen, Langå (DK)

(73) Assignee: Grundfos Management a/s, Bjerringbro (DK)

( * ) Notice: Subject to any disclaimer, the term of this patent is extended or adjusted under 35 U.S.C. 154(b) by 347 days.

(21) Appl. No.: 12/523,364

(22) PCT Filed: Dec. 29, 2007

(86) PCT No.: PCT/EP2007/011468
§ 371 (c)(1),
(2), (4) Date: Jul. 16, 2009

(87) PCT Pub. No.: WO2008/086884
PCT Pub. Date: Jul. 24, 2008

(65) Prior Publication Data
US 2010/0090635 A1      Apr. 15, 2010

(30) Foreign Application Priority Data

Jan. 18, 2007   (EP) .................................... 07000972

(51) Int. Cl.
  *F04B 35/04*     (2006.01)
(52) U.S. Cl.
  USPC ..................... 417/423.14; 417/63; 417/423.7; 310/43; 310/71
(58) Field of Classification Search
  USPC ............. 417/410.1, 423.1, 423.14, 63, 423.7; 310/89, 71, 43, 216.113, 216.137
  See application file for complete search history.

(56) References Cited

U.S. PATENT DOCUMENTS

| | | | | |
|---|---|---|---|---|
| 5,644,178 A * | 7/1997 | Halm | ............................... | 310/43 |
| 5,939,813 A * | 8/1999 | Schob | ........................... | 310/425 |
| 6,028,386 A * | 2/2000 | Kech et al. | ................... | 310/194 |
| 6,065,946 A * | 5/2000 | Lathrop | ................... | 417/423.14 |
| 6,075,304 A * | 6/2000 | Nakatsuka | ........... | 310/216.137 |
| 6,365,998 B1 * | 4/2002 | Kech et al. | ................... | 310/194 |
| 6,896,494 B2 * | 5/2005 | Sunaga et al. | ............. | 417/423.1 |
| 6,940,195 B2 * | 9/2005 | Chang et al. | ................... | 310/91 |
| 2004/0007935 A1 * | 1/2004 | Kimura et al. | ................. | 310/254 |

FOREIGN PATENT DOCUMENTS

| | | |
|---|---|---|
| DE | 100 05 505 A1 | 8/2001 |
| EP | 1 063 751 A1 | 12/2000 |
| EP | 1 204 194 A1 | 5/2002 |
| EP | 1 637 890 A1 | 3/2006 |

* cited by examiner

*Primary Examiner* — Charles Freay
*Assistant Examiner* — Thomas Fink
(74) *Attorney, Agent, or Firm* — Panitch Schwarze Belisario & Nadel LLP

(57) ABSTRACT

A pump unit includes an electric motor, located in a stator housing (6), a terminal box being arranged on an axial face of the stator housing (6). The terminal box (12) includes a tubular housing element (44) having a first axial face to which the axial face of the stator housing (6) is connected. An opposite second axial face (46) of the tubular housing element (44) is closed by at least one cover element (40) into which operating and/or display elements (38) are integrated. An electrical connecting element (42) is arranged on the outer periphery of the tubular housing element (44).

16 Claims, 10 Drawing Sheets

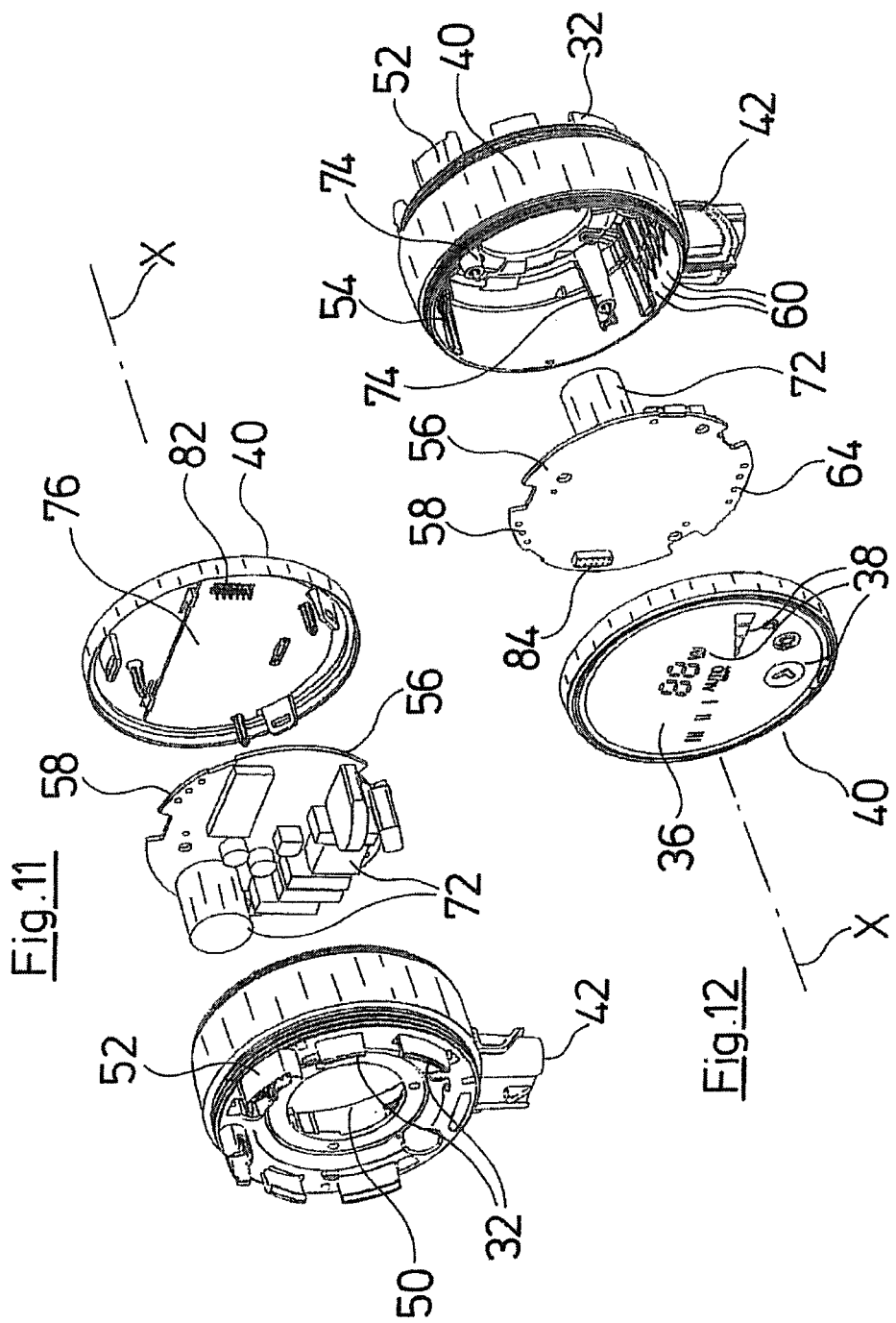

PUMP UNIT

CROSS-REFERENCE TO RELATED APPLICATIONS

This application is a Section 371 of International Application No. PCT/EP2007/011468, filed Dec. 29, 2007, which was published in the German language on Jul. 24, 2008, under International Publication No. WO 2008/086884 A1 and the disclosure of which is incorporated herein by reference.

BACKGROUND OF THE INVENTION

Embodiments of the invention relate to a pump assembly with an electric motor. Pump assemblies, which are driven by an electrical motor, are applied, for example, as heating circulation pumps. These usually comprise a pump housing with a stator housing applied thereon, in which the electric motor is arranged for the drive of an impeller arranged in the pump housing. Usually a terminal box is arranged on the stator housing and accommodates the electrical connections for the electric motor and, as necessary, electrical and electronic components for the control and/or regulation (closed loop control) of the electric motor. It is known to fasten such a terminal box on the axial side, i.e., on the end-side of the stator housing, which is distant from the pump housing. Moreover, display elements and operating elements for the control and setting of the pump assembly are often provided.

It is desirable to provide a pump assembly with a terminal box arranged on the axial side, which permits a clear and easily accessible arrangement of the operating elements and display elements, and which is furthermore inexpensive to manufacture and simple to assemble.

BRIEF SUMMARY OF THE INVENTION

The pump assembly according to embodiments of the invention includes an electric motor, which is arranged in a stator housing. The stator housing may be connected in the usual manner to a pump housing, in which the impeller of the pump is arranged. A terminal box is arranged on the stator housing on an axial end-side, i.e., preferably the end-side, which is distant to the pump assembly, and the electrical connection elements as well as electrical or electronic components are arranged in this terminal box.

According to preferred embodiments of the invention, the terminal box, as a central component, comprises a tubular housing part, which preferably is designed in an open manner at its two axial end-sides. That is, the tubular housing part includes an axial end-side which faces the stator housing, and an axial end-side which is distant to the stator housing, which preferably are designed in a open manner or have openings.

The tubular housing with a first axial end-side is directly applied onto the stator housing, closing the opening present at this end-side of the tubular housing part by the attached stator housing. The opposite, second axial end-side of the tubular housing part is closed by way of at least one cover element. The operating elements and/or display elements are integrated in this cover element. The cover element preferably covers the entire axial end-side of the tubular housing part, providing a large surface for the arrangement of the operating elements and display elements. This axial end-side permits a well visible and simply accessible arrangement of the operating elements and display elements. Moreover, an electric connection element is integrally formed on the tubular housing part, on the outer periphery. That is, the connection element that is provided with an electrical connection lead or an electrical connection forms an integral component with the housing part.

The described design of the terminal box including a tubular housing part, which is applied with one side onto the stator housing and is closed at the other side by a cover element, as a whole, permits a simple assembly, in particular with the design open at both sides, since the accessibility to the inner space of the terminal box is improved. Thus, for example, the assembly and arrangement of the components inside of the terminal box may be effected through the opening, which is closed by the cover element. The housing part may thereby be configured such that after the closure of the cover element, all components arranged in the inside are arranged in a fixed manner, so that a pre-manufactured terminal box may be created, even if the second axial end-side is still designed in an open manner. The terminal box, with this second open end-side, may be applied onto the stator housing, so that connection contacts for the connection of the stator coils may penetrate through the opening or openings on this axial end-side, into the inside of the terminal box, i.e., into the inside of the tubular housing part, and there may come into contact with electronic components in the inside of the terminal box.

Because the connection element is integrally formed on the peripheral side and extends preferably in the radial direction, it does not prevent the described assembly procedure. Moreover, the electrical connection of the complete pump assembly on the peripheral side of the terminal box is easy to accomplish, even at a later stage. The end-side of the terminal box, on which the operating elements and display elements are arranged, thereby are not covered by the electrical connection, so that the operation of the pump assembly is not compromised. Particularly preferably, the connection element is integrally formed onto the tubular housing in a direct manner, reducing the number of the individual parts and simplifying the assembly.

The connection element serves as the electrical connection of the pump assembly. The connection element may preferably be designed as an electrical connection plug, as a connection terminal, or also as a connection cable, which is arranged on the outer periphery of the tubular housing part or extend outwards on the peripheral side out of the peripheral wall. Thereby, the connection element is preferably integrally formed on the tubular component in a direct manner, so that an additional assembly is not required. Thus, a connection terminal or a connection plug may be integrally formed on the housing wall in a direct manner. Moreover, it is possible, for example, to cast a connection cable into the housing.

The tubular housing part is preferably manufactured of plastic and the connection element is preferably integrally formed onto the housing part. Thus, the connection element may be manufactured with the complete tubular housing part in one working operation, for example, by way of injection molding, so that an extremely inexpensive manufacture is possible.

Further preferably, the connection element includes electrical contacts, which are cast into the plastic and extend into the inside of the tubular housing part. This permits the electrical contacts to be introduced into the connection element at the same time as casting the tubular housing part with this connection element, so that further assembly procedures for arranging the electrical leads or contacts may be avoided. On casting the housing with the connection element, the electrical contacts are applied into the tool so that the metal parts are directly peripherally cast with the plastic. Accordingly, a sealing of the electrical contacts in the connection element is simultaneously achieved. That is, the electrical contacts extend through the housing wall of the terminal box, from the outer side to the inner side, wherein the plastic of the housing wall directly bears on the metal parts of the electrical contacts in a sealing manner. The electrical contacts of the connection element, or their free ends inside of the tubular housing part, are preferably designed in a manner such that they may directly come into contact with electrical contacts on a circuit board to be arranged in the inside of the terminal box.

Preferably, one of the electrical contacts of the connection element is provided as a ground contact, wherein its end lying in the inside of the tubular housing part is designed as a plug contact, which is electrically conductively engaged with a ground connection which is formed on the stator housing. The plug contact may, for example, be designed as sheet metal strip, which runs transversely to the joining direction of the stator housing and the terminal box, i.e., essentially normally to the longitudinal axis of the stator housing and which comprises an opening, into which a connection pin may engage on the stator housing. Spring elements which are preferably tongue-like at the edge and which engage with the surface of the connection pin with a non-positive fit and which create an electric contact, are formed in the opening. A ground contact towards the connection element may also be created in a very simple manner on joining the terminal box and the stator housing, without any additional wiring or assembly steps being required. The contact is created quasi-automatically on putting together the stator housing and terminal box.

Preferably, at least one connection plug is integrally formed on the tubular housing part on its end-side facing the stator housing, the connection plug being connected to at least one stator coil. This connection plug too is preferably cast as one piece with the tubular housing part. Thus the number of individual parts and required assembly steps are also reduced in this region. Moreover, the assembly of the terminal box, and in particular the electrical connection of the electronic components in the inside of the terminal box, to the stator coils, is very simple due to the design of the connection between the terminal box and the stator coil as a plug contact, since this may be effected simply by way of applying the terminal box onto the stator housing, wherein the connection plug on the tubular housing part engages with a corresponding plug or a corresponding coupling on the stator or stator housing.

The connection plug preferably includes electrical contacts, which are cast into the tubular housing part and which extend into the inside of the tubular housing part. Thus, on moulding or casting the tubular housing part and the connection plug, the electrical leads or contacts in the connection plug are introduced therein at the same time, so that further assembly steps may be avoided. The electrical contacts, which are provided on the connection plug for the contact with the stator coils, extend in the opposite direction as electric leads, inside of the tubular housing part. There, they are provided for the connection to a circuit board with electrical components for the control or regulation (closed loop control) of the electric motor. For this, the electrical contacts in the inside of the tubular housing part are likewise designed as plug contacts, which come into engagement with corresponding plug contacts or connection couplings on a circuit board. In this manner, a very simple connection of a circuit board in the inside of the terminal box, to the electrical connection of the stator coils is possible, since this is effected by way of the cast-in of electrical contacts in the tubular housing part.

Preferably, a circuit board with electrical and/or electronic components is arranged in the inside of the tubular housing part, wherein the circuit board extends essentially parallel to the axial end-sides of the tubular housing part as well as of the stator housing. With this, the circuit board extends essentially normally to the longitudinal axis of the stator housing, which corresponds to the rotation axis of the rotor which rotates in the inside of the stator. This arrangement ensures a reduced construction height of the complete terminal box, so that this may connect in a flat manner to the axial end-side of the stator housing. Preferably, the circuit board is arranged close to the axial end of the terminal box, which is distant from the stator housing, so that the electronic components on the circuit board are arranged essentially between the circuit board and the axial end of the stator housing. This has the advantage that the opposite side of the circuit board, which is distant to the electronic components, may be used for the connection of the operating elements and/or display elements. In this manner one may utilize the surface of the circuit board in an optimal manner.

Further preferably, the circuit board is provided with plug contacts, which are in electrically conductive engagement with the electrical contacts of the connection element and/or the electrical contacts of the at least one connection plug. Thus the free ends of the electric leads or contacts of the connection element and/or connection plug, which are situated inside of the tubular housing part, electrically conductively engage with the plug contacts on the circuit board. The free ends of the contacts extend preferably parallel to the longitudinal axis of the stator housing, i.e., in the joining direction of the terminal box, when applied onto the stator housing. The plug contacts on the circuit board thereby are designed such that the electrical contacts of the connection element or connection plug may come into engagement in this direction with the plug contacts. Thus all components of the terminal box and in particular the terminal box and the stator housing, may be stuck together in the same joining direction, specifically in the longitudinal direction of the stator housing, wherein the electrical contacts automatically come into engagement with the plug contacts on the circuit board. A very simple assembly is thereby made possible.

Preferably, the plug contacts and/or at least a part of the electrical or electronic components are arranged on the surface of the circuit board, which faces the stator housing.

Particularly preferably, of the components arranged on the surface of the circuit board, which faces the stator housing, the components with a larger constructional height are arranged in an annular manner and in a manner such that a free space is left by these components in a central region of the tubular housing part, into which free space an axial end of a can arranged in the stator housing extends. That is, with this arrangement, the circuit board is preferably arranged close to the end of the tubular component, which is distant from the stator housing, and the electronic components extend, proceeding from the circuit board, onto the stator housing. A free space, into which the axial end of the can may engage, remains in the central region of the tubular housing part, in front of the circuit board, as viewed from the stator housing, due to the fact that the components with a large construction height are arranged in a peripheral region on the circuit board. This is, in particular, the region of the can in which a rotor bearing is arranged. A compact constructional shape, with a lowest possible extension in the axial direction of the stator housing and of the applied terminal box, is achieved in this manner.

The cover element, preferably on its side facing the inside of the tubular housing part, includes connection contacts for the operating elements and display elements, wherein the connection contacts are electrically conductively engaged with corresponding connection contacts on the circuit board in the tubular housing part. The connection contacts between the cover element and the circuit board are preferably designed as plug contacts, which may be brought into engagement with one another in a direction parallel to the longitudinal axis of the stator housing, i.e., in the joining direction of the tubular housing part and cover element. It is thus possible to apply the cover element onto the terminal box simply in the direction of the longitudinal axis of the stator housing, simultaneously bringing the connection contacts on the cover element into electrically conductive engagement with the connection contacts on the circuit board, which was previously arranged in the inside of the tubular housing part.

The cover element preferably comprises a carrier plate, which at its surface distant to the tubular housing part is at least partly covered by a cover plate, in which the surfaces of the operating elements and/or windows are formed for the display elements. The carrier plate thereby forms the actual cover, which closes the tubular housing part on the axial side. The cover plate or cover layer forms the terminating axial surface, and contains the optical design of the operating elements and display elements, in particular possibly also lettering, type details, or the like. Thereby, the cover plate may be designed partly transparent, in order to let light shine through from the display elements lying therebehind. The cover plate may be, for example, a cover film.

Further preferably, a circuit board is arranged on the surface of the cover element, which faces the tubular housing part, or between the carrier plate and the cover plate, on which circuit board the operating elements and/or display elements are arranged and preferably connection contacts are formed. This circuit board serves for the electrical connection of the operating elements and display elements and may support further electronic components, which in particular are required for the operation of the operating elements and display elements. The circuit board may be arranged on the inner side of the cover element, i.e., inside of the terminal box, wherein recesses are preferably provided in the carrier plate, through which light may shine from the display elements on the circuit board to the outside, or operating elements may be actuated from the outside. The connection contacts are preferably arranged on the side of the circuit board, which face the inside of the tubular housing, and serve, as described above, for coming into engagement with connection contacts on the circuit board in the inside of the tubular housing part. The circuit board on the cover element extends preferably normally to the longitudinal direction of the stator housing, i.e., preferably parallel to the circuit board inside of the tubular housing part. Instead of electrically contacting the two circuit boards to one another in a direct manner, further electrical leads for connecting both circuit boards may also be arranged in the tubular housing part and/or the cover element.

Alternatively, it is possible for the circuit board to be arranged on the cover element on the outer side of the carrier element. For this, a recess is formed in the carrier element, on the outer side, i.e., the side which is distant to the inner space of the tubular housing part, into which recess the circuit board is inserted. The circuit board is then covered by the cover plate to the outside. In this case, preferably a recess is provided in the carrier element, through which recess connection contacts may extend into the inside of the tubular housing part.

The tubular housing part is connected to the stator housing preferably via locking elements. Alternatively or additionally, the tubular housing part is connected to the cover element via locking elements. This permits a simple assembly without special tools.

The tubular housing part preferably comprises a round, in particular circular, cross section. The cross section particularly preferably corresponds to the cross section at the axial end of the stator housing, so that here one may create a harmonious or smooth transition. The round design moreover permits a good sealing of the interfaces between the stator housing and the tubular housing part or between tubular housing part and cover element.

Preferably, seals which seal the inner space of the terminal box to the outside are arranged between the tubular housing part and the stator housing and/or between the tubular housing part and the cover element. Particularly preferably, these seals are integrally injected onto the tubular housing part and/or the cover element. This is effected preferably with two-component injection moulding directly on manufacture of the housing part or the cover element. Liquid silicone rubber (LSR) is preferably applied as a material for the seals. Seals of liquid silicone may be injected directly onto the plastic parts of the tubular housing part or of the cover element. Particularly preferably, the cover plate or the cover layer of the cover element, or the operating elements on the cover element, are formed of the same material as a seal arranged on the cover element. This permits the cover layers or the operating elements to be formed with the seal, which serves for sealing between the cover element and the stator housing, on the cover element in one working operation. The cover plate preferably covers the outer side of the cover elements in a complete manner.

The electric motor preferably comprises a stator with an iron core, which may be formed, for example, from a multitude of layered sheet metal parts, and on which one or more windings are arranged, depending on the design of the electric motor. Thereby, the iron core may be designed of one piece or of several parts, and surrounds a central, circular free space, in which the rotor of the electric motor is arranged. Additionally, preferably a can may be arranged, which separates a fluid-filled rotor space from the stator, as is normal with wet-running electric motors. Moreover, winding carriers are preferably arranged on the iron core, on which the windings are arranged and which electrically insulate the windings with respect to the iron core.

Preferably, the stator and the stator housing are formed in a manner such that the stator housing is manufactured as a cast component, into which the iron core is cast in a direct manner. Thereby, the iron core may be formed as a pre-manufactured component, for example, of layered sheet metal, which is inserted into the tool on casting the stator housing and then, on casting the material of the housing, is subjected to peripheral flow in part regions, so that a positive-fit and/or material-fit connection is created between the stator housing and the iron core. Thus as single-piece component which fulfils the function of the stator housing and iron core, is created on casting the stator housing by way of simultaneously casting in the iron core.

The stator is then preferably manufactured further in a manner such that the windings are not arranged on the iron core until after the casting-in or casting of the iron core and stator housing on the iron corer. That is, firstly the iron core is arranged in the stator housing, which is effected by casting-in, and only subsequently are the windings applied into the iron core or deposited onto the iron core. Thus, the insertion of the iron core into the stator housing with the required fixation in the stator housing after arrangement of the windings is avoided. The assembly of the stator and the stator housing is significantly simplified by way of the single-part design of the stator housing and iron core on casting the stator housing. Moreover, a permanent fixation of the iron core in the stator housing, which is simple to realize, is achieved.

Particularly preferably, the windings are wound around the iron core after the casting of the iron core into the stator housing. That is, the winding of the windings from one or more wires is not effected until inside of the stator housing, after the iron core is fixedly arranged there by way of casting-in. This has the advantage that, after the winding, only one integrated component consisting of stator and stator housing exists, in which the coils or windings are arranged in a protected manner.

Preferably, the stator housing of plastic is manufactured as an injection molded part. The iron core may be easily cast into such an injection molded part by way of inserting the iron core into the tool before the casting of the injection molded part, and then the iron core being subjected to peripheral flow by the plastic in the desired part regions, on casting. A lightweight, but firm stator housing may be created from plastic.

Further preferably, a coil carrier is simultaneously formed on the iron core by way of casting the iron core into the stator housing. This particularly lends itself if the stator housing is manufactured from plastic, since the coil carrier should be formed in an electrically insulating manner. Thus the coil carrier or the coil carriers may be simultaneously injected or cast with the stator housing and connected to the iron core, significantly reducing the number of individual parts and assembly steps.

The stator housing is preferably designed in a tubular manner with openings on both axial end-sides, wherein the stator housing is connected at a first axial end-side to a pump housing, and is closed at an opposite second, axial end-side by a cover or terminal box. The tubular design of the stator housing has the advantage that the stator housing with the iron core, which is firmly connected therein, is accessible from both end-sides on introducing or winding the windings inside of the stator housing, so that the introduction of the windings is simplified.

Preferably, fastening means are formed on the stator housing for connection to the pump housing. These may be, for example, flange-like projections with through-holes, through which bolts or screws are guided, which create the connection to the pump housing. Preferably corresponding fastening means are also provided for fastening the cover or the terminal box. Moreover, seals may be provided between the cover and the stator housing and/or between the stator housing and the pump housing, in order to seal the pump assembly, and in particular the stator housing, to the outside. Accordingly, O-rings may be inserted at the interfaces or, for example, seals may also be formed directly and fixedly connected on the stator housing and/or the cover or the pump housing. Such seals, e.g., made of a suitable material, may be directly cast or injected onto the respective housing part.

The tubular stator housing particularly preferably has a round, and in particular a circular, cross section, so that in particular the open end-sides have a round or circular cross section. This is advantageous for the sealing of the gap between the stator housing and the cover, or between the stator housing and the pump housing, since a round or circular gap is better to seal.

Further preferably, operating elements and/or display elements are arranged on the axial side on the cover and the terminal box. The operating elements and/or display elements are thus arranged on the outer surface of the cover or of the terminal box, with the outer surface being distant from the stator housing, making the operating and/or display elements well accessible from the outside. Moreover, a large plane surface is available on which the operating elements and/or display elements may be arranged in a clear manner.

Further preferably, the electric motor is designed as a wet-running electric motor with a can. Such electric motors are preferred, in particular with heating circulation pumps.

The can thereby is preferably fixed in the axial and preferably also in the radial direction in the region of the axial end face of the stator housing, which faces the pump housing. It is preferable that the can is held in a defined position in the stator, so that the rotor may rotate inside of the can in an uninhibited manner. Moreover, usually the end of the rotor, which is distant to the pump assembly, is mounted at the axial end of the can. Thus, the can must be fixed in order to be able to accommodate the bearing forces of the rotor. Conventionally the can is fixed in the stator housing at the end which is distant from the pump assembly and at which the rotor mounting is also arranged. According to embodiments of the invention, one now forgoes this fixation, and the can is only fixed at the end which faces the pump assembly. More free space at the axial end of the stator housing, which is distant from the pump assembly, is thereby created, which favors the assembly and the arrangement of further components, such as for example, the terminal box. Moreover, one does not need to provide a receiver for the can in the stator housing at the axial end which is distant from the pump assembly, wherein this receiver would project into the inner cross section of the stator housing. This improves the accessibility of the iron core, which is arranged in the stator housing and which receives the windings. The can may particularly preferably be fixed between the pump housing and the stator housing with a non-positive fit and/or with a positive fit, for fixing the can on the stator side which faces the pump housing, so that a fixation of the can may be achieved on connecting the stator and the pump housing.

Preferably, the can at its axial end which faces the pump housing includes an outwardly projecting collar which is fixed, in particular clamped, between the pump housing and the stator housing. The collar ideally forms a radially outwardly extending annular projection, which is fixed in a corresponding recess between the stator and the pump housing, in a manner such that the can is fixed with a non-positive fit and/or positive fit, in the axial direction and preferably also in the radial direction.

Thereby, the can with its collar may bear in the axial direction, and preferably also in the radial direction, directly on a receiver region at the axial end of the stator housing, or on an intermediate ring arranged inside of the stator housing at its axial end. The intermediate ring is inserted into the axial end-side opening of the stator housing, which faces the pump housing, and forms a bearing surface or receiver for the can. In particular, the intermediate ring forms a bearing surface in the axial direction. Further preferably, the intermediate ring is however also formed such that it includes a central opening which in its cross section or diameter is dimensioned such that the can at its outer periphery may come to bear on the inner periphery of the opening of the intermediate ring, and the intermediate ring ensures a fixation of the can in the radial direction. The intermediate ring is fixed on the stator housing in the axial and preferably also in the radial direction. This may be effected with a non-positive fit, positive fit, and/or material fit. Thereby, the arrangement of the intermediate ring has the advantage that on incorporating the windings into the stator housing, the end-side opening of the stator housing, which faces the pump housing, may also be completely open so that the iron core is also better accessible from this side. Only after incorporating the windings may the intermediate ring, which accommodates the can, be inserted. Alternatively, a component corresponding to the intermediate ring may be integrally formed onto the stator housing and form the receiver region for the can.

According to a further preferred embodiment of the invention, a terminal box is arranged on the stator housing on an axial end-side, and includes a tubular housing part which is formed open at its two axial end-sides. Thereby, the tubular housing part is applied with a first open axial end-side onto the axial end-side of the stator housing. The opposite, second axial end-side of the tubular housing part is closed by at least one cover element, into which operating elements and/or display elements are integrated. Moreover, a radially outwardly extending connection plug is integrally formed on the tubular housing.

Moreover, a suitable method for manufacturing a pump assembly according to the preceding description, in particular for manufacturing a stator of the pump assembly, is preferably provided. According to this method, the manufacture of the stator is effected in a manner such that an iron core of the stator is cast directly into the stator housing, on casting the stator housing, i.e., preferably is integrated into the stator housing. Thereby, the casting-in of the iron core is effected before the windings are arranged on the iron core. The windings are only deposited onto the iron core, preferably wound directly onto the iron core, after the casting of the iron core into the stator housing. The stator housing, as described above, is preferably formed of plastic and is manufactured with the injection molding method. Thereby, it is very simply possible to cast the iron core into the plastic, i.e., to encase it completely or partly by the plastic. Thereby, the winding carriers, preferably of the same material as the stator housing, may simultaneously be integrally cast or integrally formed onto the iron core, onto which the windings are later deposited. The previous description is referred to with regard to preferred designs or further preferred method steps on manufacture of the stator or the pump assembly.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Embodiments of the invention are hereinafter described by way of example and by way of the attached figures. In these there are shown in the drawings:

FIG. 11 is an exploded view of the terminal box seen from the side facing the stator housing;

FIG. 12 is a exploded view of the terminal box according to FIG. 11, seen from the outer side;

DETAILED DESCRIPTION OF THE INVENTION

Figure 1:
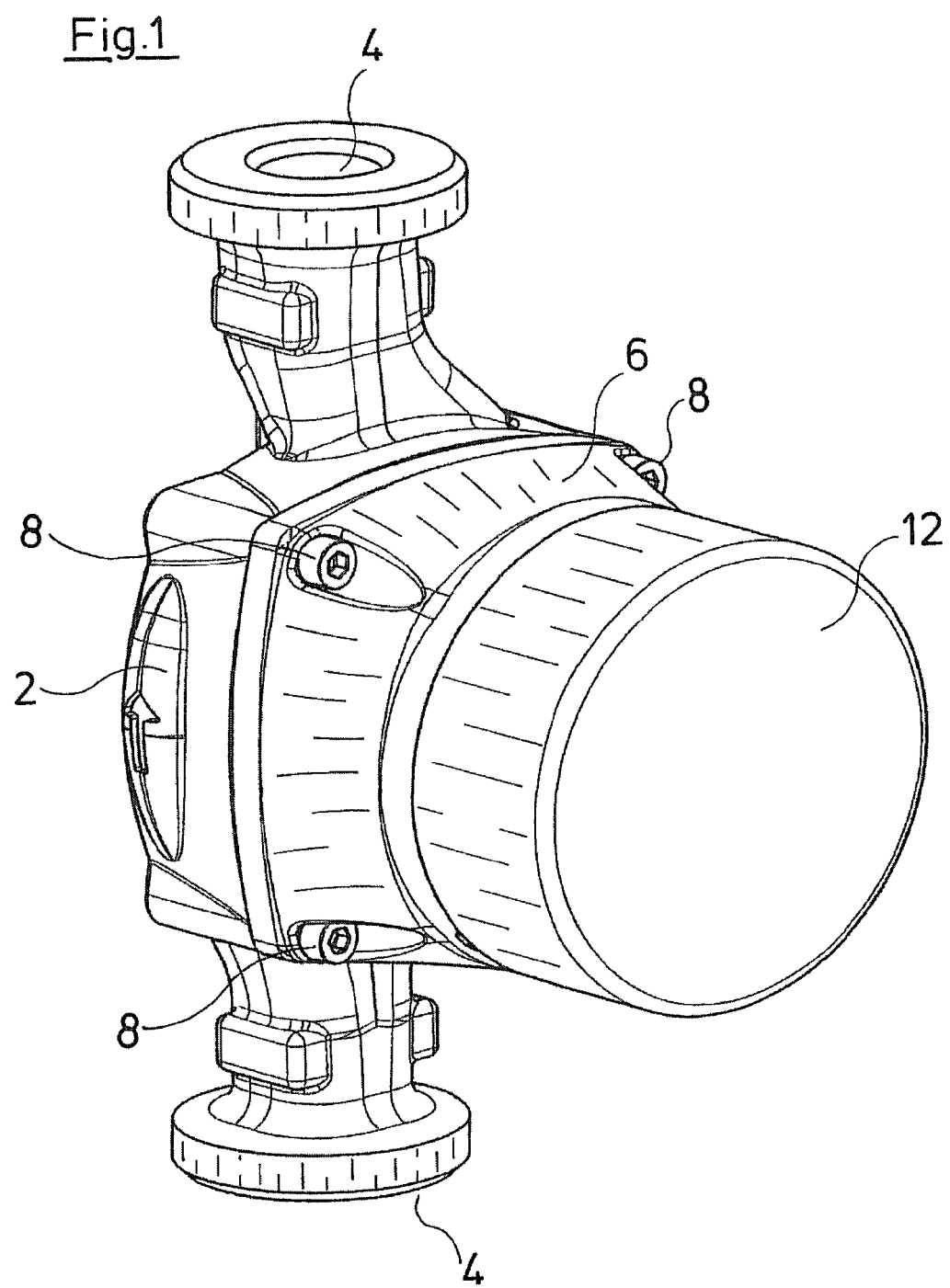
FIG. 1 is a perspective total view of a pump assembly.

With regard to the pump assembly described hereinafter, of the embodiment shown is a heating circulation pump assembly with a wet-running electric motor. The pump assembly, which is represented in FIG. 1 in the assembled condition, includes a pump housing 2 with conduit connections 4 for connection of the pump assembly to external pipework. An impeller of the pump is arranged in the pump housing 2 in a conventional manner and is not shown in the attached figures. A stator housing 6, in which an electrical drive (i.e., an electric motor) of the pump assembly is arranged, is applied onto the pump housing 2. The stator housing 6 is screwed to the pump housing 2 via fastening means in the form of screws 8, which extend through through-holes 10 in the stator housing 6.

A terminal box 12 is applied on the axial end-side of the stator housing 6, which is distant to the pump housing 2. Thereby, the direction of the rotation axis of the pump assembly, which extends centrally through the stator housing 6, is to be understood as the axial direction. Contact planes between the stator housing 6 and the pump housing 2, as well as between the stator housing 6 and the terminal box 12, extend essentially normally to this rotation axis or longitudinal axis X.

Figure 2:
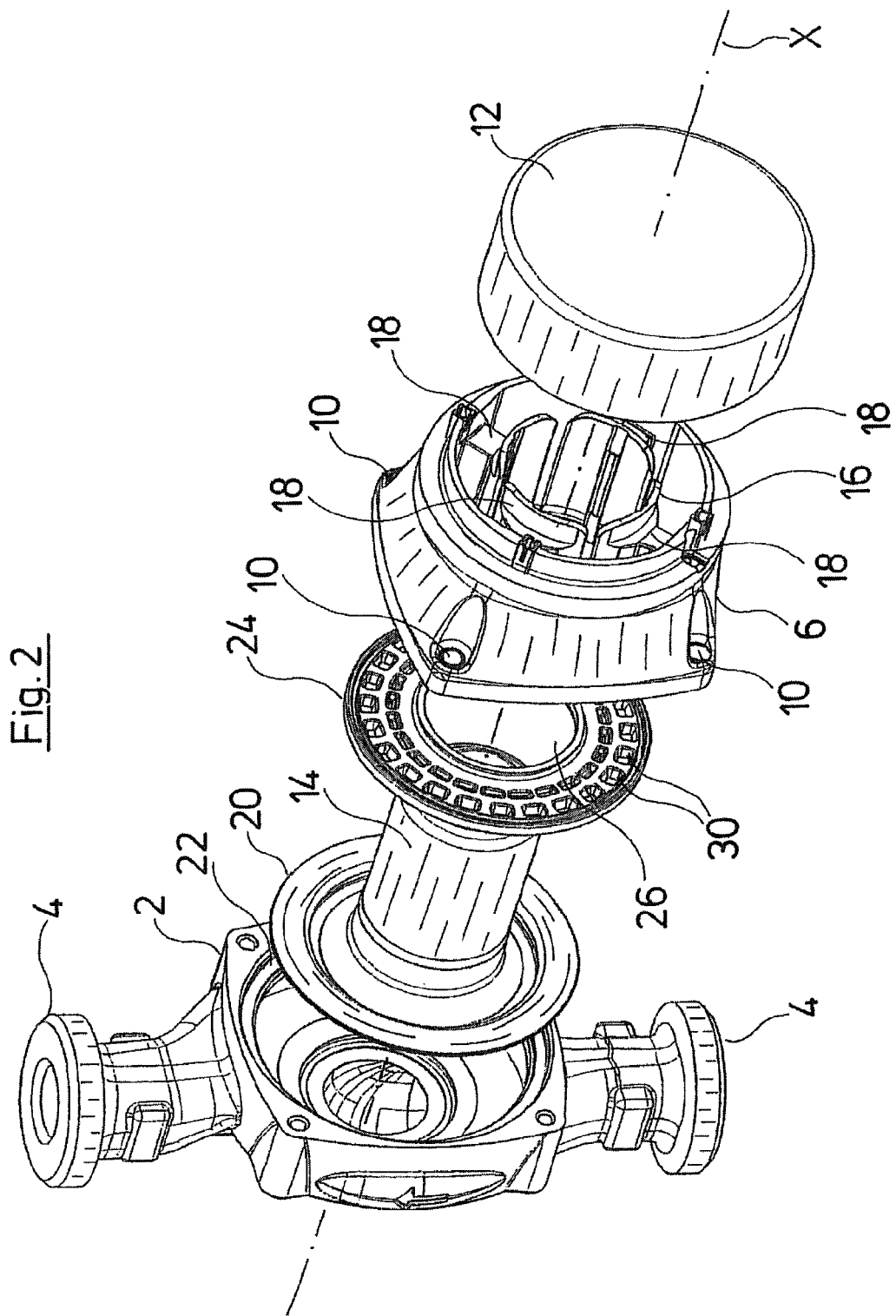
FIG. 2 is an exploded view of the pump assembly according to FIG. 1.

FIG. 2 in an exploded view shows the essential individual parts of the pump assembly. The components, apart from the pump housing 2 and the stator housing 6, as well as the terminal box 12, are a can 14 as well as the iron core 16 of the stator, which is arranged inside of the stator housing 6.

Figure 3:
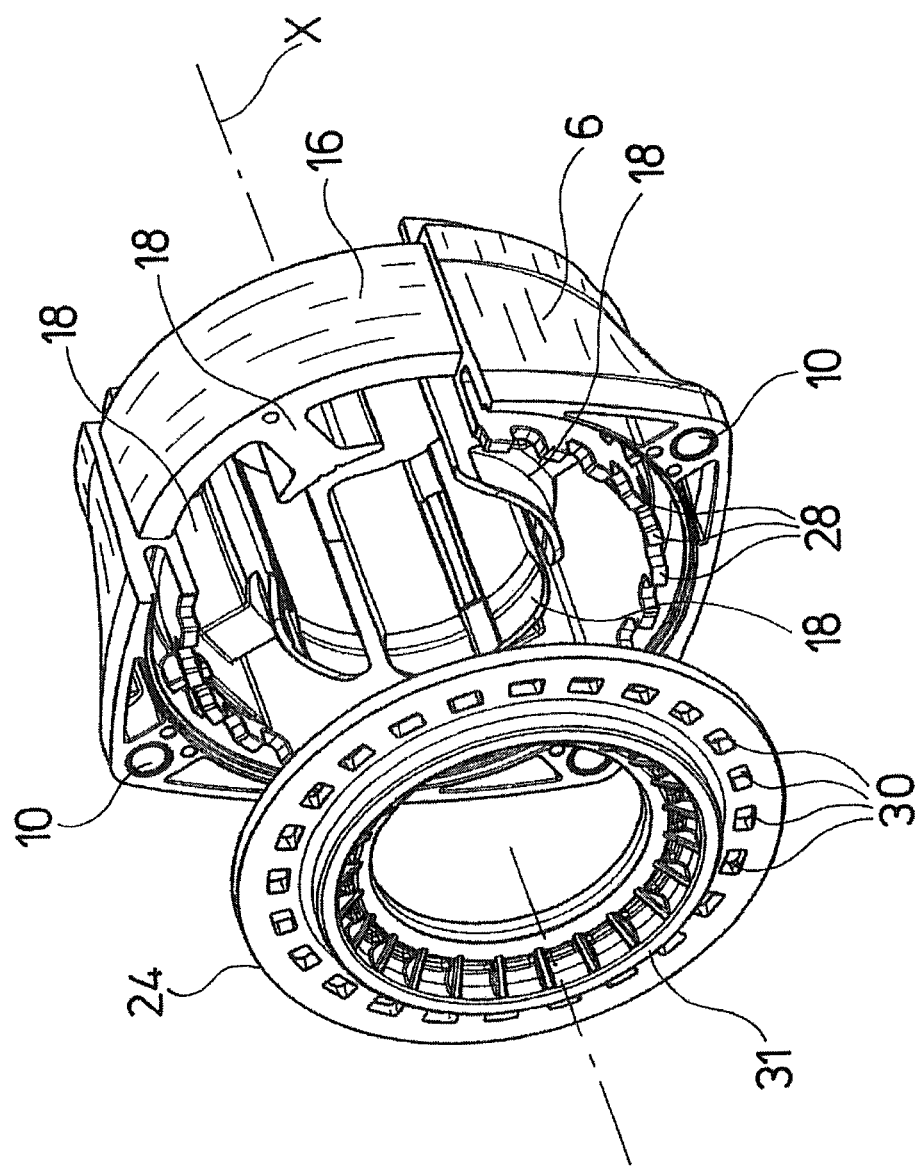
FIG. 3 is a partly sectioned exploded view of the stator housing.

As is to be recognized in particular in FIG. 3, in which the stator housing 6 is partly cut open, the iron core 16 is designed essentially as an annular component with radially inwardly extending salient poles 18. Four such salient poles 18 are provided in the shown embodiment example. The iron core 16 with the salient poles 18, in the known manner, may be formed, for example, of layered sheet metal. The salient poles 18 may be designed as one piece with the surrounding ring of the iron core 16, but also several components may be assembled.

The iron core 16 is connected to the stator housing 6 by way of casting in. The stator housing 6 is formed of plastic as an injection molded part. On casting the stator housing 6, the iron core 16 has been applied into the tool such that the iron core 16 is subjected to the peripheral flow by the plastic of the stator housing 6, and the iron core 16 is cast into the stator housing 6. Thus, in particular, the circular outer ring of the iron core 16 lies within the peripheral wall of the stator housing 6 and is preferably completely enclosed by the plastic of the stator housing 6. An electrical insulation is created in this manner.

Figure 5:
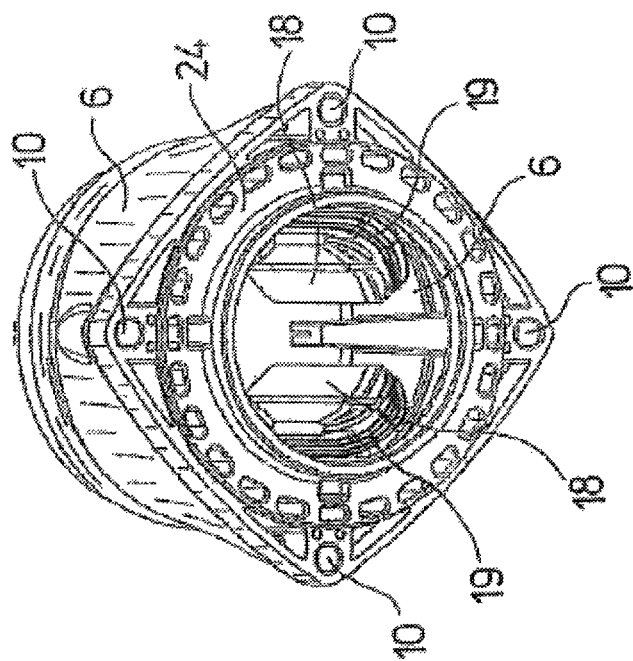
FIG. 5 is a perspective view of the stator housing seen from the side which faces the pump housing.
Figure 4:
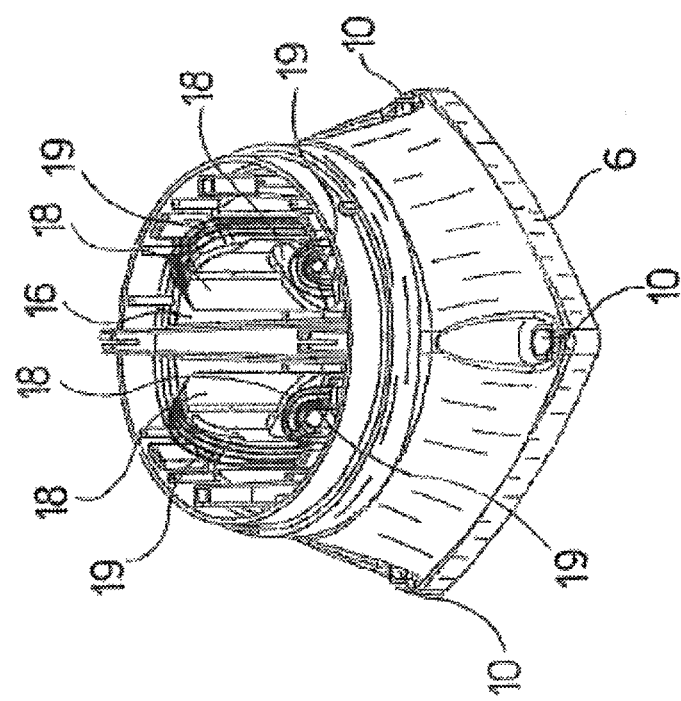
FIG. 4 is a perspective view of the stator housing seen from the side which is distant from the pump assembly.
Figure 6:
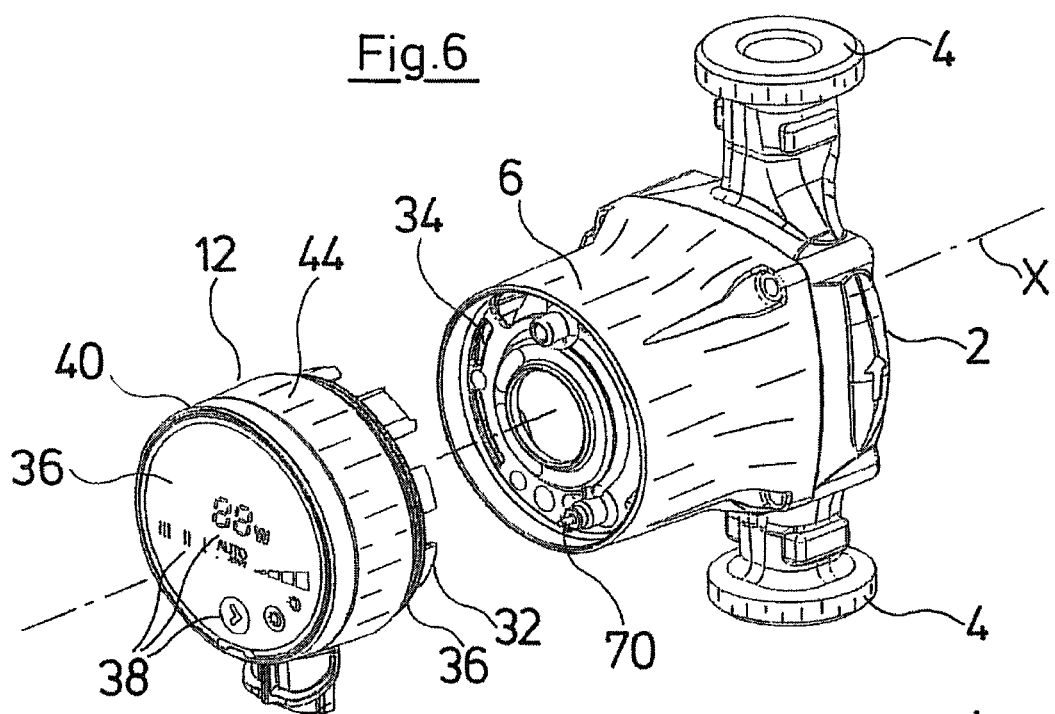
FIG. 6 is a perspective view of the pump assembly according to FIG. 1, with a removed terminal box.
Figure 7:
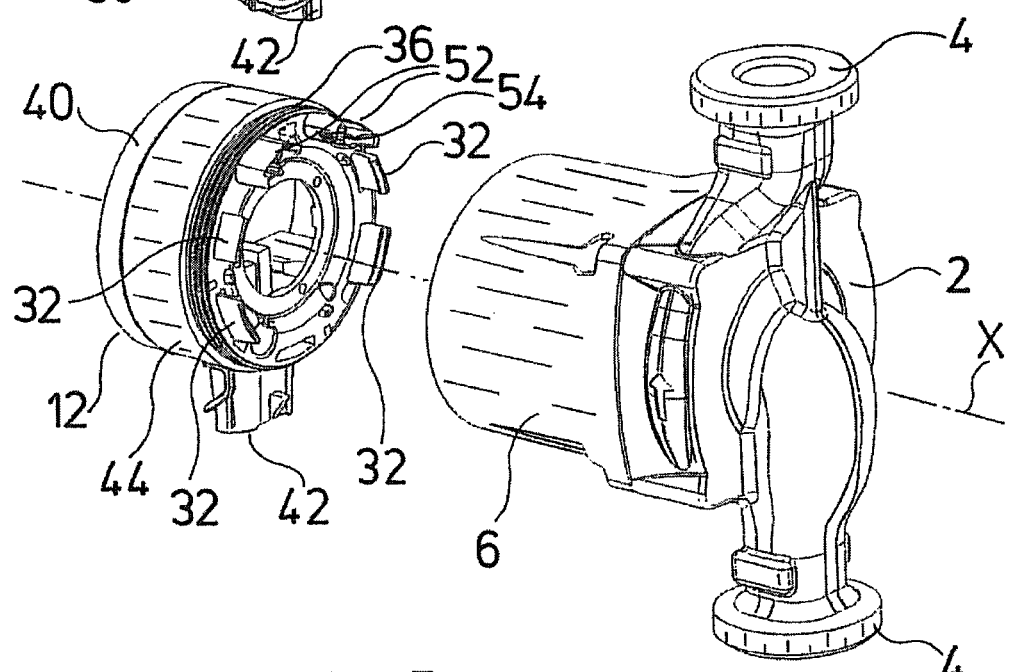
FIG. 7 is a perspective view of the pump assembly according to FIG. 6 with a view of the side of the terminal box, which faces the stator housing.

In the broken up region in FIG. 3, a salient pole 18 is shown in an exposed manner. The salient poles 18 however, as is to be recognized by way of the other three salient poles shown in FIG. 3 as well as the FIGS. 2, 4 and 5, are likewise encased with the plastic material of the stator housing 6, so that coil carriers (not shown) are also formed simultaneously on the salient poles 18 as one piece with the stator housing 6, and these salient poles electrically insulate the coils to be arranged, with respect to the iron core 16. The coils are arranged on the iron core 16 on the salient poles 18 after the casting of the iron core 16 into the stator housing 6. This is effected, for example, in a manner such that coils are wound directly onto the salient poles 18 or the coil carriers formed thereon, inside of the stator housing 6. This is made more favorable due to the fact that the stator housing 6 is designed in an essentially tubular manner and is designed open to both axial end-sides, i.e., to the end-side which faces the pump housing 2 and to the end-side which faces the terminal box 12, so that the salient poles 18 are accessible from both axial sides for winding the coils. This accessibility is in particular also improved by way of the can 14 not being mounted or fixed on the axial end of the stator housing 6, which faces the terminal box 12. The fixation of the can 14 is effected at the axial side of the terminal box 6 which faces the pump housing 2. As is to be recognized in FIG. 2, a radially outwardly projecting annular collar 20 is formed on the open end of the can 14 which faces the pump housing 2. The can 14 with the collar 20 is preferably of one piece, for example of rust-free stainless steel or plastic. The collar 20 forms an annular bearing surface, which with its side which faces the pump housing 2 comes to bear on an annular bearing surface 22 on the pump housing 2. Thereby, a seal (not shown) may be arranged between the collar 20 and the abutment 22.

An intermediate ring 24 is provided for fixing the can 14. The intermediate ring 24 includes a central circular recess 26, whose inner periphery comes to bear on the outer periphery of the can 14 and serves for the radial fixation of the can in the stator housing 6. The intermediate ring 24 is fixed on the stator housing 6 with a positive fit. Teeth 28, shown in FIG. 3, are arranged along a circular line and extend in the axial direction and are formed in the stator housing 6, engaging corresponding recesses 30 in the intermediate ring 24. The intermediate ring 24 may also be fixed on the stator housing 6 in a different manner than by way of the teeth 28 which are formed with the stator housing 6 as one piece. The intermediate ring 24 on its side facing the pump housing 2 includes an annular bearing surface 31, which comes to bear on the side of the collar 20 of the can 14, said side facing the stator housing 6. Thus the intermediate ring 24 with the bearing surface 31 pushes against the collar 20 and thus the collar 20 onto the bearing surface 22 on the pump housing 2. The intermediate ring 24 is fixed on the stator housing 6 by way of the engagement of the teeth 28, so that the stator housing 6, when screwed to the pump housing 2 via the screws 8, pushes the intermediate ring 24 against the collar 20 of the can 14. In this manner, the can 14, when fastening the stator housing 6 on the pump housing 2, is fixed or clamped between the stator housing 6 and the pump housing 2, and thus via the collar 20, at its end facing the pump housing 2, is fixed on the pump housing 2 and the stator housing 6 in the axial direction. Apart from the intermediate ring 24, the annular bearing surface 22 or its peripheral surrounding wall of the pump housing 2, may serve for the radial fixation of the can 14 by way of the peripheral edge of the collar 20 coming to bear.

The design of the intermediate ring 24 as a separate component has the advantage that the salient poles 18 in the stator 6 are firstly freely accessible, so that the windings 19 may be easily introduced. After introducing the windings 19, the intermediate ring 24 may be applied onto the stator housing 6, by which the annular space in the stator housing 6, in which the windings 19 are arranged, is at least partly closed at the axial side facing the pump housing 2 by the intermediate ring 24. Alternatively, it is also possible to design the intermediate ring 24 not as a separate component, but as one piece with the stator housing 6, as is shown in FIG. 5. The design of the stator housing 6 which is shown in FIG. 5, is otherwise identical to the previously described embodiment. Only here, the annular component which corresponds to the intermediate ring and forms a receiver region for the can is cast as one piece with the stator housing 6.

The design of the terminal box 12 is now described in more detail by way of FIGS. 6 to 15.

The terminal box 12 is applied onto the axial end of the stator housing 6, which is distant to the pump housing 2. Thereby, the terminal box 12, by way of locking hooks 32 which project in the axial direction from the end-side facing the stator housing 6, is fixed on corresponding recesses 34 in the stator housing 6. A shoulder 36 is formed in the region of the outer periphery of the terminal box 12 and the shoulder 36 engages inside of the stator housing 6, and a seal is arranged in its region. The seal may then be directly injected on the terminal box 12 or it may be the case of a seal to be inserted, for example an O-ring. A good sealing is possible here, since with regard to the described pump assembly, the gap to be sealed between the pump housing 2 and the stator housing 6, as well as the gap between the stator housing 6 and the terminal box 12, are designed in the manner of an annulus. The outer periphery of the terminal box 12 corresponds to the outer periphery of the stator housing 6 at its ends facing the terminal box 12, so that a smooth transition from the stator housing 6 to the terminal box 12 without shoulders is given when the terminal box 12 is attached.

Operating elements and display elements 38, as well as other desired components, are attached on the axial end-face 36 of the terminal box 12, which is distant from the stator housing 6. Thereby, the axial-side end-face 36 is formed by a cover element or cover 40, which closes the terminal box 12 on the axial side. Furthermore, a connection plug 42, as a connection element, is formed peripherally on the terminal box 12 as one piece with the housing wall of the terminal box 12.

Figure 8:
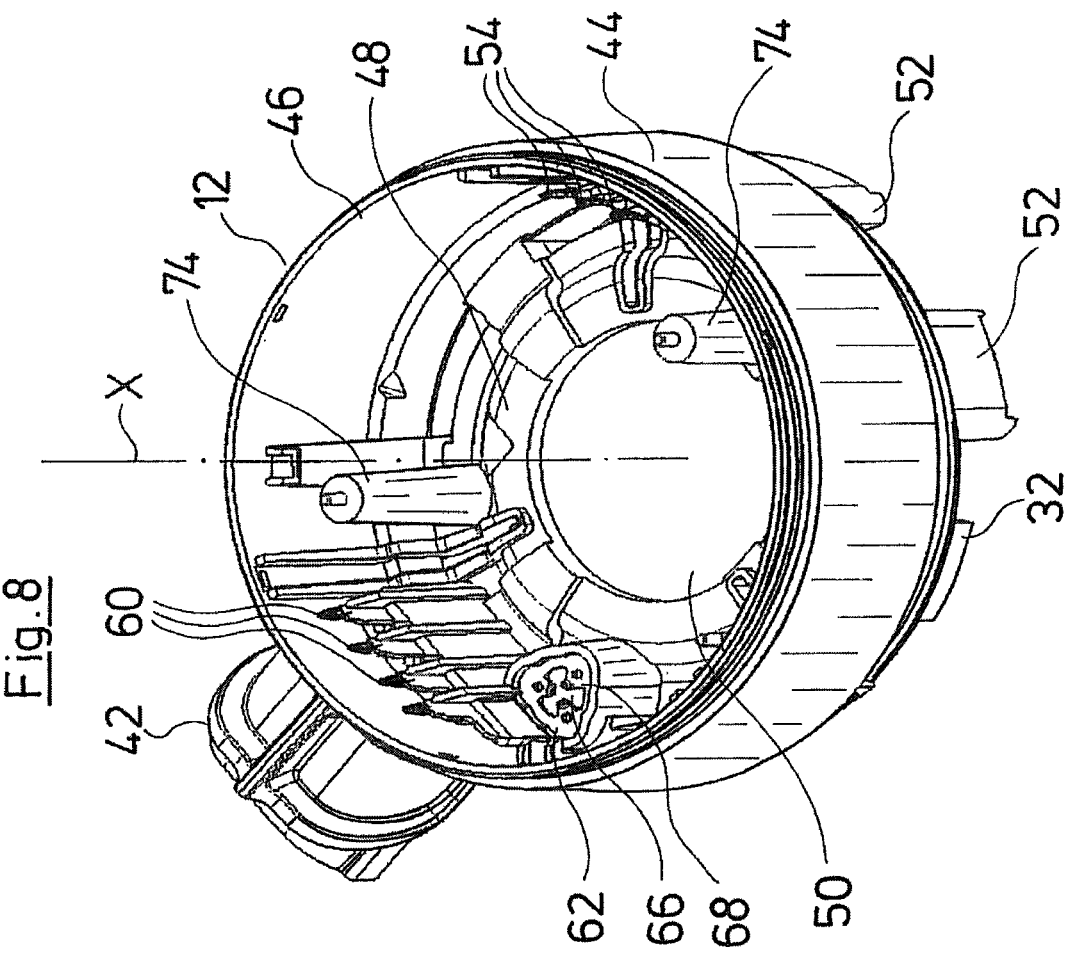
FIG. 8 is a perspective view of a housing part of the terminal box.
Figure 10:
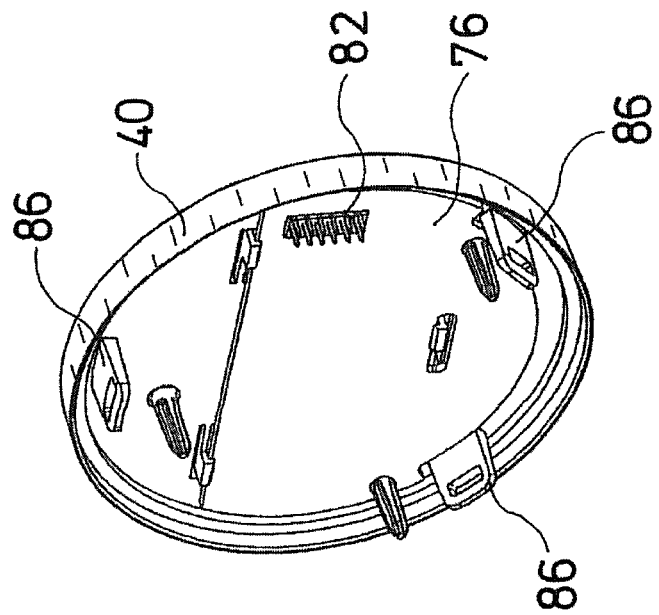
FIG. 10 is a perspective view of the terminal box cover seen from the inner side.
Figure 9:
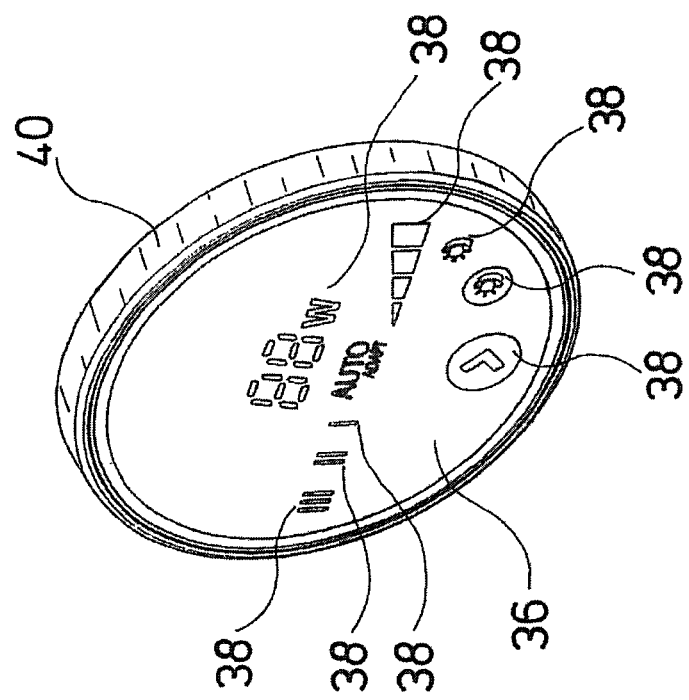
FIG. 9 is a perspective view of the terminal box cover seen from the outside.
Figure 13:
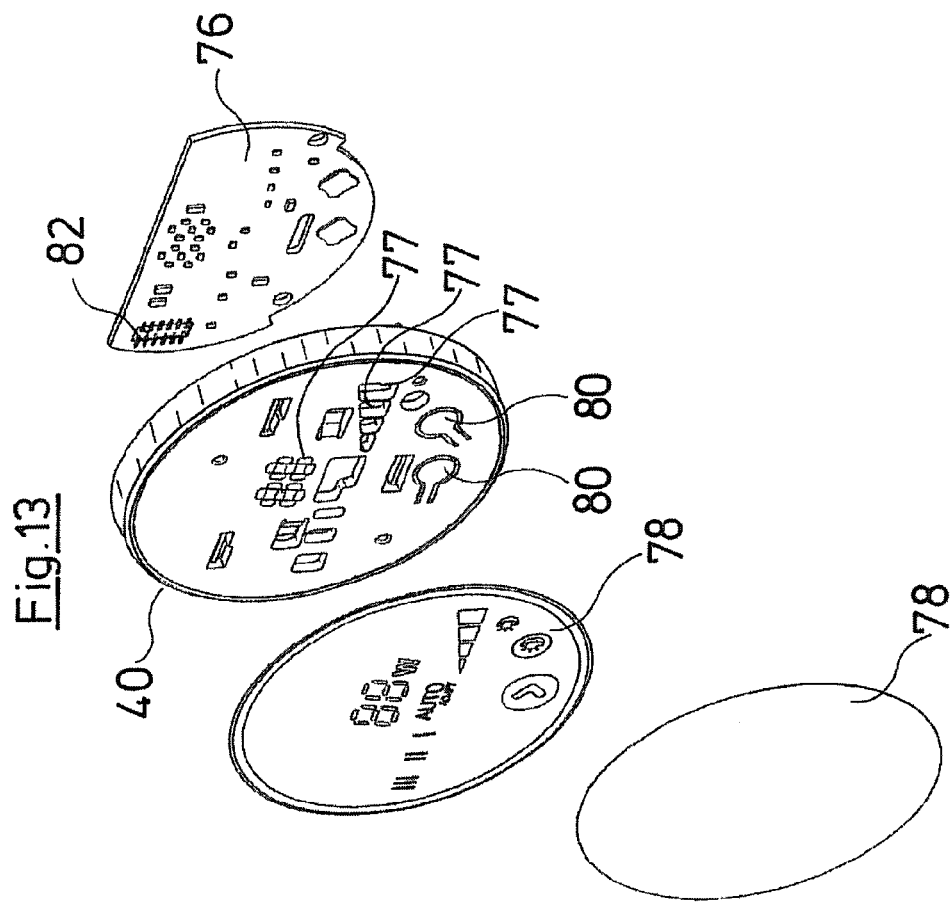
FIG. 13 is an exploded view of the terminal box cover, seen from the outer side.
Figure 14:
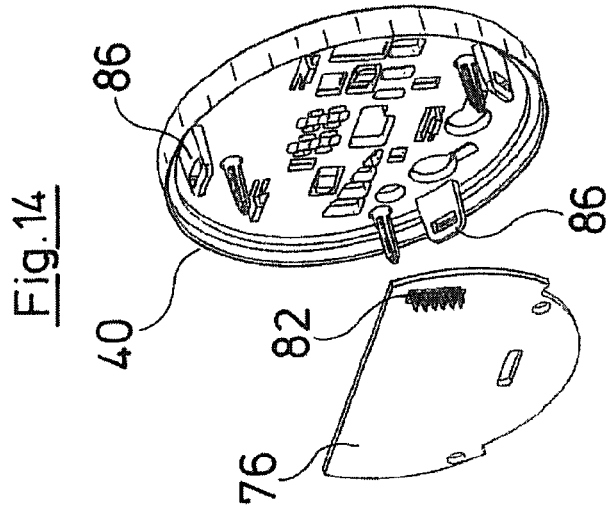
FIG. 14 is an exploded view of the terminal box cover, seen from the inner side.

The central component of the terminal box 12 is a tubular housing part 44 which is shown in FIG. 8 as an individual part. The tubular housing part 44 of the terminal box 12 is an integral component of plastic, which is manufactured with the injection molding method. The connection plug 42 extends radially outwards, proceeding from the peripheral wall of the housing part 44, and is formed with the housing part 44 as one piece. The locking hooks 32 are also formed as one piece with the housing part 44. The housing part 44 is designed in a completely open manner at the end-side which is distant from the stator housing 6, i.e., has a circular opening 46, which is closed by the cover 40. A radially inwardly directed collar 48 with a central circular opening 50 is formed on the annular housing part 44 on the opposite end-side, which faces the stator housing 6. The can 14 with its axial end which is distant from the pump housing 2 engages into this circular opening 50.

Moreover, the locking hooks 32, as well as a connection plug 52, which likewise extend in the axial direction to the stator housing 6 and engage into this in the assembled condition, are provided at the axial end, on which the collar 48 is formed. The connection plug 52 serves for the connection of the coils or windings in the stator housing, and comes into engagement with corresponding contacts or plugs in the stator housing 6, when the terminal box 12 is applied onto the stator housing 6. The connection plugs 52 include electrical contacts or leads 54, which are cast into the plastic of the component 44. Metal strips, preferably punched sheet metal parts, are applied into the tool before the injection molding of the component 44, so that the leads 54 are then cast into the plastic. Alternatively, the leads 54 may also be formed such that they are inserted or applied into the component 44 at later stage. The leads 54 create the connection between the coils of the stator and a circuit board 56, which is arranged in the terminal box 12 and on which the control and regulation electronics for the operation of the pump assembly, for example also a frequency converter, are arranged. For this connection, the leads 54 engage into corresponding plug contacts or connection contacts 58 on the circuit board 56 (see FIGS. 11 and 12).

Accordingly, the connection plug 42 also includes electric contacts or leads 60, 62, of which the lead 62 is designed as a ground contact. The leads 60, 62 are also cast directly into the plastic of the component 44 in the previously described manner as with the leads 54, so that one may make do without an additional sealing on the connection plug 42, to the inner space of the component. It is alternatively also possible to insert the leads 60, 62 as separate components into corresponding openings in the connection plug 42 at a later stage, wherein then a separate seal must be provided as necessary. The leads 60 extend inside of the component 44 as well as the leads 54 with their free axial ends in the axial direction X, and serve for the electric connection of the circuit board 56 on which suitable plug contacts and connection contacts 64 are arranged, into which the leads 60 may engage with their free ends (see FIG. 12).

The ground contact 62 is designed in a manner such that its free end which is distant from the connection plug 42 is angled in a manner such that it extends in a plane normal to the longitudinal axis X. In this region, the ground contact is designed such that it includes an opening 66, which is surrounded by three surrounding tongues 68. On assembly of the terminal box, a ground connection in the form of a contact pin 70, which is arranged on the stator or stator housing 6 and likewise extends in the axial direction, enters into this opening. Thereby, the tongues 68 come into contact with the peripheral wall of the contact pin 70. The tongues 68 thereby are deflected in a resilient manner, so that secure bearing and reliable contact is given between the ground contact 62 and the contact pin 70.

The circuit board 56 with the electronic components 72 arranged thereon, is inserted into the housing part 44, as is represented in FIGS. 11 and 12. The circuit board 56 thereby is inserted through the opening 46 which is closed by the cover 40, into the inner space of the terminal box 12. The circuit board 56 comes to lie on column-like projections 74, which are likewise formed as one piece with the housing part 44 (see FIG. 8). These column-like projections 74 keep the circuit board 56 distanced to the collar 48, so that the electronic components 72 on the circuit board are arranged between the circuit board and the collar 48 in the inside of the terminal box 12. That is, the circuit board 56 in its installed condition lies on the axial end of the terminal box 12, which faces the cover 40. Accordingly, the free ends of the electrical leads 54 and 60 are placed inside of the component 44 such that they engage in the corresponding position into the connection contacts 58 and 64 on the circuit board 56. The electronic components 72 are distributed on the circuit board 56 such that those components with a large construction height are arranged in the peripheral region, so that they do not project into the space of the terminal box 12, which is situated axially above the opening 50. This space thus remains free, so that here the axial end of the can 14 may project into the terminal box 12.

A further circuit board 76, on which the operating elements and display elements 38 as well as the components necessary for their operation are arranged, is arranged in the cover element or cover 40 which is shown in more detail in FIGS. 9-10 and 13-15. The wiring of the operating elements and display elements 38 is formed on this circuit board 76. The operating elements and display elements 38 may for example contain light emitting diodes (LEDs), which are assembled with surface mount device (SMD) technology. With regard to the examples shown in FIG. 9-14, the circuit board 76 is fastened on the inner side of the cover 40, preferably by way of locking elements. Openings 77 are provided in the cover 40 for the display elements. Alternatively, the cover 40 may also be designed in a transparent manner. The cover 40 at its outer side, i.e., its side which is distant from the housing part 44, is covered by a cover film 78, which forms the actual end-face 36. The cover film 78 closes the openings 77 and includes the necessary lettering. Moreover, single-piece spring elements 80 for the actuation elements are formed in the cover 40. The cover film 78 is designed in a suitably elastic manner, so that the spring elements 80 may be pressed through the cover film 78. The spring elements 80 then press onto corresponding switch elements or contact elements on the circuit board 76. Electrical connection contacts in the form of axially projecting pins are formed on the circuit board 76 for the electric connection of the circuit board 76 to the circuit board 56. The connection contacts 82 are electrically conductively engaged with corresponding connection contacts or connection sockets 84 on the circuit board 56. This permits the cover 40 to be simply applied onto the component 44 after insertion of the circuit board 56 into the component 44. Thereby, the connection contacts 82 and 84 come into electrically conducive engagement between the circuit board 76 previously mounted in the cover, and the circuit board 56. This therefore permits a very simple assembly of the terminal box, since all components are put together in the same axial direction X.

The fastening of the cover 40 on the housing part 44 is effected in a simple manner via locking elements 86. A simple assembly without screws or the like is thus possible.

Figure 15:
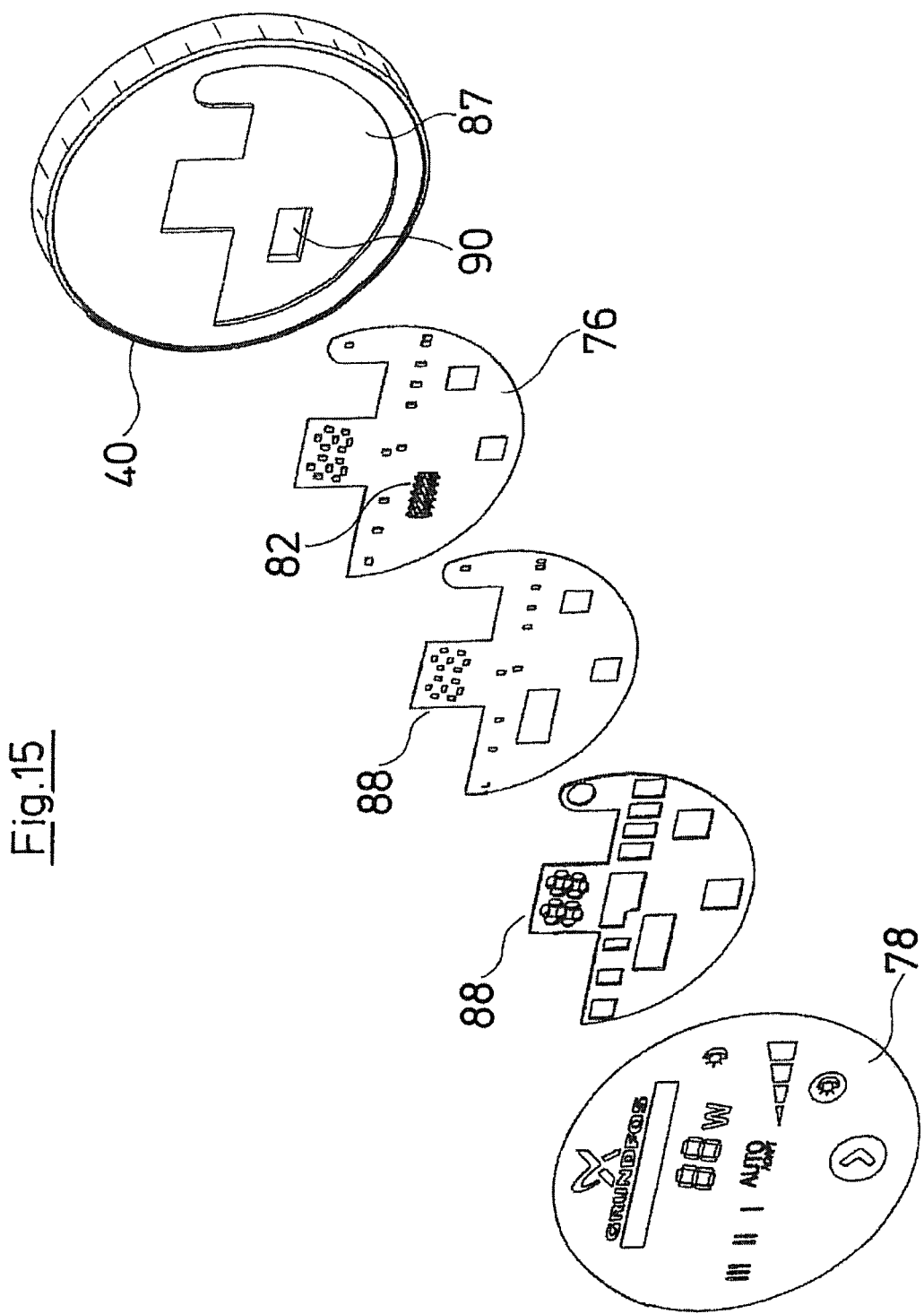
FIG. 15 is an exploded view of a terminal box cover according to a second embodiment.

FIG. 15 shows an alternative embodiment of the cover 40, with which the circuit board 76 is not arranged on the inner side of the cover 40, but in a recess 87 on the outer side of the cover 40. Intermediate layers 88 lie above the circuit board 76. The recess 87 is then closed or covered to the outside by way of the cover film 78. A recess 90 is provided in the cover 40 for the connection contacts 82 on the circuit board 76, through which recess 90 the connection contacts 82 extend to the inner side of the cover 40, in order to come into engagement with the connection contacts 84 of a circuit board.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A pump assembly with a wet-running electric motor comprising a can, which is arranged in a stator housing having first and second axial end-sides, the first axial end-side of the stator housing having an opening that extends into the stator housing and receives the can, wherein a terminal box is arranged on the stator housing on the second axial end-side of the stator housing, the terminal box comprising a tubular housing part, the tubular housing part having a first axial end-side applied onto the second axial end-side of the stator housing, the first axial end-side of the tubular housing part having an opening into which the can engages, a second axial end-side of the tubular housing part opposite the first axial end-side of the tubular housing part is closed by at least one cover element, into which at least one of operating elements and display elements are integrated, and an electrical connection element is arranged on the tubular housing part on an outer periphery thereof, wherein a circuit board with at least one of electrical and electronic components is arranged inside of the tubular housing part, the circuit board extending essentially parallel to the first and second axial end-sides of the tubular housing part and the second axial end-side of the stator housing, the electrical connection element including at least one lead or contact that is electrically connected to at least one contact of the circuit board, and wherein at least the electrical or electronic components facing the stator housing having a construction height extending generally perpendicular to the circuit board and exceeding a predetermined height are distributed in a region of the circuit board that is radially outside of a coaxial periphery of the can such that a free space is created in a central region of the tubular housing part, the can extending beyond the second axial end-side of the stator housing such that an axial end of the can is disposed in the free space in the tubular housing part.

2. The pump assembly of claim 1, wherein the connection element is one of a connection plug, a connection terminal, and a connection cable.

3. The pump assembly according of claim 1, wherein the tubular housing part is manufactured of plastic, and the electrical connection element is a connection plug integrally formed on the housing part as one piece.

4. The pump assembly of claim 3, wherein the connection plug comprises electrical contacts, which are cast into the plastic and extend inside of the tubular housing part.

5. The pump assembly of claim 4, wherein one of the electrical contacts is provided as a ground contact, wherein an end of the ground contact which lies inside of the tubular housing is a plug contact, which is electrically conductively engaged with a ground contact formed on the stator housing.

6. The pump assembly of claim 1, wherein at least one connection plug is integrally formed on the tubular housing part on the end-side of the tubular housing part which faces the stator housing, the at least one connection plug being connected to at least one stator coil.

7. The pump assembly of claim 6, wherein the connection plug comprises electrical contacts which are cast into the tubular housing part and extend inside of the tubular housing part.

8. The pump assembly of claim 1, wherein the circuit board is provided with plug contacts, which are electrically conductively engaged with at least one of electrical contacts of the electrical connection element and electric contacts of at least one connection plug.

9. The pump assembly of claim 8, wherein the at least one of the plug contacts and at least a part of the electrical or electronic components are arranged on the surface of the circuit board facing the stator housing.

10. The pump assembly of claim 1, wherein the at least one cover element, at a side which faces the inside of the tubular housing part, comprises connection contacts for operating elements and display elements, wherein the connection contacts are electrically conductively engaged with corresponding connection contacts on the circuit board in the tubular housing part.

11. The pump assembly of claim 1, wherein the at least one cover element comprises a carrier plate which, at a surface which is distant from the tubular housing part, is covered at least partly by a cover plate, in which surfaces of at least one of operating elements and windows for display elements are formed.

12. The pump assembly of claim 11, wherein a circuit board is arranged on one of a surface of the cover element which faces the tubular housing part and between the carrier plate and the cover plate, on which circuit board the at least one of the operating elements and display elements are arranged and connection contacts are formed.

13. The pump assembly of claim 1, wherein at least one of the connection of the tubular housing part to the stator housing, and the tubular housing part to the cover element is provided via locking elements.

14. The pump assembly of claim 1, wherein the tubular housing part has a round cross section.

15. The pump assembly of claim 14, wherein the tubular housing part has a circular cross section.

16. The pump assembly of claim 1, wherein the electric motor comprises a stator with an iron core and windings arranged thereon, wherein the stator housing is a cast component, into which the iron core is cast, and the windings are deposited onto the iron core after the casting of the iron core into the stator housing.

* * * * *